(12) United States Patent
Foo et al.

(10) Patent No.: US 8,540,165 B2
(45) Date of Patent: Sep. 24, 2013

(54) LAMINATED ELECTRONIC CARD ASSEMBLY

(75) Inventors: Eric Foo, Thousand Oaks, CA (US); Joan Ziegler, Tiburon, CA (US); Mark Poidomani, Windermere, FL (US); Lawrence Routhenstein, Ocoee, FL (US); Ziv Alon, Newbury Park, CA (US); Charles McGuire, Newbury Park, CA (US)

(73) Assignee: PrivaSys, Inc., Tiburon, CA (US)

( * ) Notice: Subject to any disclaimer, the term of this patent is extended or adjusted under 35 U.S.C. 154(b) by 0 days.

(21) Appl. No.: 13/438,700

(22) Filed: Apr. 3, 2012
(Under 37 CFR 1.47)

(65) Prior Publication Data

US 2012/0188732 A1    Jul. 26, 2012

Related U.S. Application Data

(63) Continuation of application No. 12/892,759, filed on Sep. 28, 2010, and a continuation-in-part of application No. 13/102,991, filed on May 6, 2011, now Pat. No. 8,231,063, which is a continuation of application No. 12/726,868, filed on Mar. 18, 2010, now Pat. No. 7,954,724, which is a continuation of application No. 11/413,595, filed on Apr. 27, 2006, now abandoned, which is a continuation-in-part of application No. 11/391,719, filed on Mar. 27, 2006, now abandoned.

(60) Provisional application No. 60/594,300, filed on Mar. 26, 2005, provisional application No. 60/675,388, filed on Apr. 27, 2005.

(51) Int. Cl.
*G06K 19/02* (2006.01)

(52) U.S. Cl.
USPC ............ 235/492; 235/380; 235/451; 235/488

(58) Field of Classification Search
USPC .......................... 235/375, 380, 451, 488, 492
See application file for complete search history.

(56) References Cited

U.S. PATENT DOCUMENTS

| 4,353,064 | A | 10/1982 | Stamm |
| 4,394,654 | A | 7/1983 | Hoffmann-Cerfontaine |

(Continued)

FOREIGN PATENT DOCUMENTS

| WO | WO9852735 | 11/1998 |
| WO | WO0247019 A1 | 6/2002 |
| WO | WO2006105092 | 10/2006 |
| WO | WO2006116772 | 11/2006 |

*Primary Examiner* — Tuyen K Vo
(74) *Attorney, Agent, or Firm* — Roy L Anderson; Wagner, Anderson & Bright, P.C.

(57) ABSTRACT

An electronic card is assembled from top and bottom graphic layers, top and bottom thermal sensitive adhesion tapes and an inlay assembly laminated together. The inlay assembly is made of a sub-assembly of a PCB base with one or more electronic components mounted to it, thermal sensitive adhesion tape and a stiffening substrate, all laminated together, while a battery insert and possible additional inserts made of PVC are mounted in openings in the sub-assembly around electronic components such as the battery. The stiffening substrate has a thermal coefficient substantially the same as that of the PCB base. The card need not contain any solder connections and is ISO 7810 compliant. Lamination is performed at a warm, not hot, temperature that does not damage the battery or melt any components together.

20 Claims, 13 Drawing Sheets

(56) References Cited

U.S. PATENT DOCUMENTS

| | | | |
|---|---|---|---|
| 4,529,870 A | 7/1985 | Chaum | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 4,876,441 A * | 10/1989 | Hara et al. | 235/488 |
| 4,995,077 A * | 2/1991 | Malinowski | 379/357.03 |
| 5,038,251 A | 8/1991 | Sugiyama et al. | |
| 5,168,520 A | 12/1992 | Weiss | |
| 5,237,614 A | 8/1993 | Weiss | |
| 5,272,596 A | 12/1993 | Honore | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman et al. | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |
| 5,657,388 A | 8/1997 | Weiss | |
| 5,748,737 A | 5/1998 | Daggar | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,122,704 A * | 9/2000 | Hass et al. | 711/100 |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,163,771 A | 12/2000 | Walker et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski, Jr. | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski, Jr. et al. | |
| 6,293,470 B1 * | 9/2001 | Asplund | 235/487 |
| 6,313,724 B1 | 11/2001 | Osterweil | |
| 6,323,770 B1 | 11/2001 | Dames | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Juels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,641,050 B2 | 11/2003 | Kelley et al. | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,755,341 B1 | 6/2004 | Wong et al. | |
| 6,769,618 B1 | 8/2004 | Finkelstein | |
| 6,776,332 B2 | 8/2004 | Allen et al. | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,853,412 B2 | 2/2005 | Stephenson | |
| 6,873,974 B1 | 3/2005 | Schutzer | |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,008,500 B2 * | 3/2006 | Smulson | 156/252 |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moulette et al. | |
| 7,136,514 B1 | 11/2006 | Wong | |
| 7,140,550 B2 | 11/2006 | Ramachandran | |
| 7,143,953 B2 | 12/2006 | Takahashi et al. | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,237,724 B2 | 7/2007 | Singleton | |
| 7,246,752 B2 | 7/2007 | Brown | |
| 7,278,586 B2 | 10/2007 | Takahashi et al. | |
| 7,298,243 B2 | 11/2007 | Juels et al. | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Liu et al. | |
| 7,359,507 B2 | 4/2008 | Kaliski, Jr. | |
| 7,360,688 B1 | 4/2008 | Harris | |
| 7,363,494 B2 | 4/2008 | Brainard et al. | |
| 7,380,710 B2 | 6/2008 | Brown | |
| 7,389,425 B2 | 6/2008 | Hasbun | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,532,104 B2 | 5/2009 | Juels | |
| 7,543,739 B2 | 6/2009 | Brown et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 | 9/2009 | Osterweil et al. | |
| 7,591,427 B2 | 9/2009 | Osterwell | |
| 7,602,904 B2 | 10/2009 | Juels et al. | |
| 7,641,124 B2 | 1/2010 | Brown et al. | |
| 7,660,902 B2 | 2/2010 | Graham et al. | |
| 7,959,085 B2 * | 6/2011 | Singleton | 235/492 |
| 2001/0034702 A1 | 10/2001 | Mockett | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |

| | | |
|---|---|---|
| 2003/0052168 A1 | 3/2003 | Wong |
| 2003/0057278 A1 | 3/2003 | Wong |
| 2003/0105964 A1 | 6/2003 | Brainard et al. |
| 2003/0116635 A1 | 6/2003 | Taban |
| 2003/0152253 A1 | 8/2003 | Wong |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty et al. |
| 2004/0162732 A1 | 8/2004 | Rahim et al. |
| 2004/0172535 A1 | 9/2004 | Jakobsson et al. |
| 2004/0177045 A1 | 9/2004 | Brown |
| 2005/0040243 A1* | 2/2005 | Bi et al. ............ 235/492 |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0168339 A1* | 8/2005 | Arai et al. ............ 340/572.8 |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski, Jr. et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0186209 A1 | 8/2006 | Narendra et al. |
| 2006/0237543 A1* | 10/2006 | Goto et al. ............ 235/492 |
| 2006/0256961 A1 | 11/2006 | Brainard et al. |
| 2007/0114274 A1 | 5/2007 | Gibbs et al. |
| 2007/0174614 A1 | 7/2007 | Duane et al. |
| 2007/0192249 A1 | 8/2007 | Biffle et al. |
| 2007/0235548 A1* | 10/2007 | Singleton ............ 235/492 |
| 2007/0241201 A1 | 10/2007 | Brown et al. |
| 2008/0040271 A1 | 2/2008 | Hammad et al. |
| 2008/0040276 A1 | 2/2008 | Hammad et al. |
| 2008/0096326 A1 | 4/2008 | Reed |
| 2008/0148394 A1 | 6/2008 | Poidomani et al. |
| 2008/0201264 A1* | 8/2008 | Brown et al. ............ 705/67 |
| 2009/0108064 A1 | 4/2009 | Fernandes et al. |
| 2009/0255996 A1 | 10/2009 | Brown et al. |
| 2009/0286150 A1* | 11/2009 | Nelson et al. ............ 429/162 |
| 2009/0315320 A1* | 12/2009 | Finn ............ 283/107 |
| 2010/0066072 A1* | 3/2010 | Paeschke et al. ............ 283/83 |
| 2011/0017833 A1* | 1/2011 | Cullen et al. ............ 235/492 |
| 2011/0266349 A1* | 11/2011 | Bi et al. ............ 235/488 |

* cited by examiner

LAMINATED ELECTRONIC CARD ASSEMBLY

CROSS-REFERENCE TO RELATED APPLICATIONS

The present application is a continuation of U.S. patent application Ser. No. 12/892,759, filed Sep. 28, 2010, the disclosure of which is specifically incorporated herein by reference. The present application is also a continuation-in-part of U.S. patent application Ser. No. 13/102,991, filed May 6, 2011, which is a continuation of U.S. Ser. No. 12/726,868, now issued as U.S. Pat. No. 7,954,724, which was a continuation application of U.S. Ser. No. 11/413,595, filed Apr. 27, 2006, which was a continuation-in-part application of U.S. Ser. No. 11/391,719, filed Mar. 27, 2006 and which also claimed the priority benefit of U.S. Ser. No. 60/675,388, filed Apr. 27, 2005, all of which are specifically incorporated herein by reference.

FIELD OF THE PRESENT INVENTION

The present invention is in the field of electronic cards.

BACKGROUND OF THE INVENTION

The credit and debit card industry issues billions of cards. In the United States, most such cards include a magnetic stripe, but no contactless chip.

It has long been a goal of many different entities to produce an electronic card that can function with legacy magnetic stripe readers, while also working with contactless chip readers, while also providing additional security and other functioning capabilities due to electronic processing functions performed in the card. Such a card must have a power source, a microprocessor and various electronic components, yet it must still function within the constructs of current standards as to size, flexibility, readability, and security, to name a few. Also, such a card must be capable of being manufactured for a reasonable cost for high volume production.

In view of all of the constraints facing development of a such a suitable electronic card, such a card has not yet been introduced to the market, despite a long felt need for such a card, and ongoing research and development efforts by many different entities. The present invention advances the field of electronic cards by finally introducing an electronic card that can be manufactured for a reasonable cost that can meet all of the constructs necessary for its acceptance.

SUMMARY OF THE INVENTION

The present invention is generally directed to an electronic card that is assembled so as to have a top and a bottom graphic layer, a top and a bottom thermal sensitive adhesion tape and an inlay assembly laminated together. The inlay assembly is made of a sub-assembly of a PCB base with one or more electronic components mounted to it, thermal sensitive adhesion tape and a stiffening substrate, all laminated together, while a battery insert is mounted to the sub-assembly around the battery in a battery opening of the sub-assembly. The stiffening substrate has a thermal coefficient substantially the same as that of the PCB base while the battery insert has a greater bending flexibility than the stiffening substrate.

In a first, separate group of aspects of the present invention, one or more additional inserts are added around electronic components, the inserts are made of a flexible plastic (e.g., PVC), electronic components are surface-mounted to the PCB base, an electrical connection between the battery and the PCB base is made by a z-axis conductive tape, the stiffening substrate, the battery and one of the one or more electronic components have a thickness that is approximately the same, the card assembly does not contain any solder connections and the card is ISO 7810 compliant.

In a second, separate group of aspects of the present invention, the card is manufactured by laminating the inlay sub-assembly in a first lamination step, then the inserts are added and a second lamination step finishes making the card. The second lamination step relies upon adhesion of the top and the bottom thermal sensitive adhesion tapes to form a laminated structure and is performed at a temperature (e.g., less than approximately 90° C.) that is below a maximum operating temperature of the battery.

Accordingly, it is a primary object of the present invention to advance an electronic card assembly that is viable and can be manufactured at a reasonable cost while still meeting the necessary constructs necessary for its use and acceptance.

These and further objectives and advantages will be apparent to those skilled in the art in connection with the drawings and the detailed description of the invention set forth below.

BRIEF DESCRIPTION OF THE DRAWINGS

FIGS. 2-4 and 11-12 illustrate the five components that are laminated together to form the card shown in FIG. 1 while

DETAILED DESCRIPTION OF THE INVENTION

The present invention is generally directed to a card, such as a debit or credit card, which has the capability of performing electronic functions. For such a card to be widely accepted, it should be able to satisfy the internationally accepted ISO 7816 Standard for Smart Cards, the disclosure of which is specifically incorporated herein by reference. In addition, for such a card to be used as a credit or debit card, it must also be able to satisfy the internationally accepted ISO 7810 standard, the disclosure of which is specifically incorporated herein by reference. These standards, and some of the considerations that go into the various electronic components needed to satisfy these standards, are set forth in greater detail in U.S. Ser. No. 11/413,595, filed Apr. 27, 2006, the disclosure of which is specifically incorporated herein by reference.

The present invention will now be discussed in connection with one or more preferred embodiments shown in the Figures. In the Figures and the following more detailed description, numerals indicate various features of the invention, with like numerals referring to like features throughout both the drawings and the description. The following glossary has been arranged to show the relationship of components and similar features by using similar numbering so as to aid the reader. Thus, for example, the top surface of any layer will end with a T while the bottom surface of any layer will end with a B, the top surface of the card being the surface that commonly has embossing and a card number, the bottom surface of the card being the surface that commonly has a signature block and, if present, a magnetic stripe. Although the Figures are described in greater detail below, the following is a glossary of the elements identified in the Figures.

Figure 1:
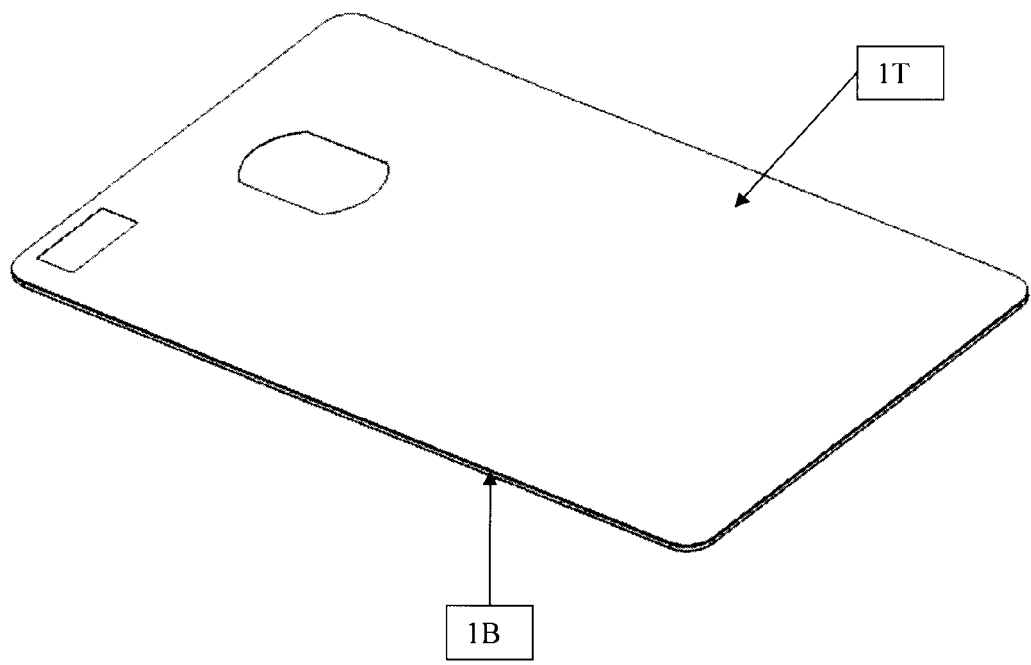
FIG. 1 illustrates an assembled electronic card according to the present invention.
Figure 2:
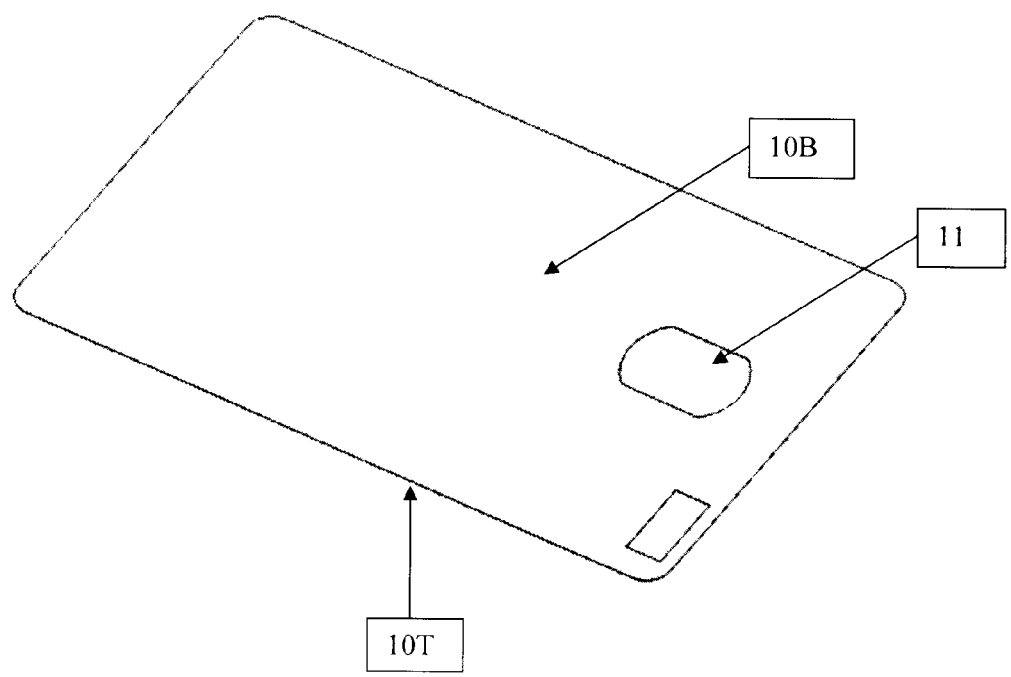
Figure 3:
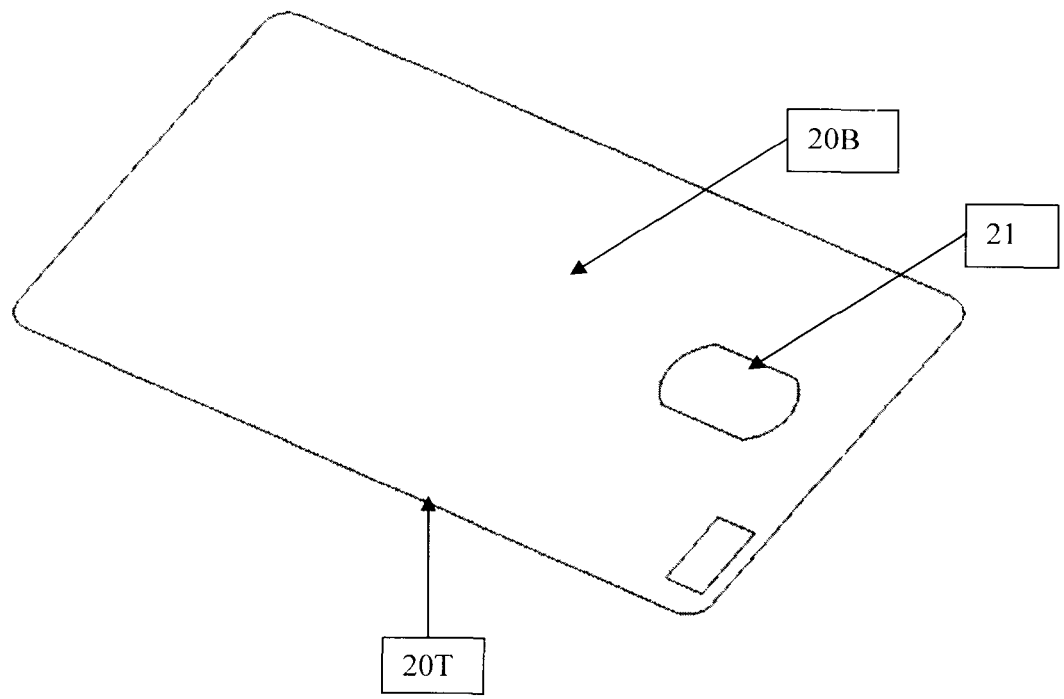
Figure 4:
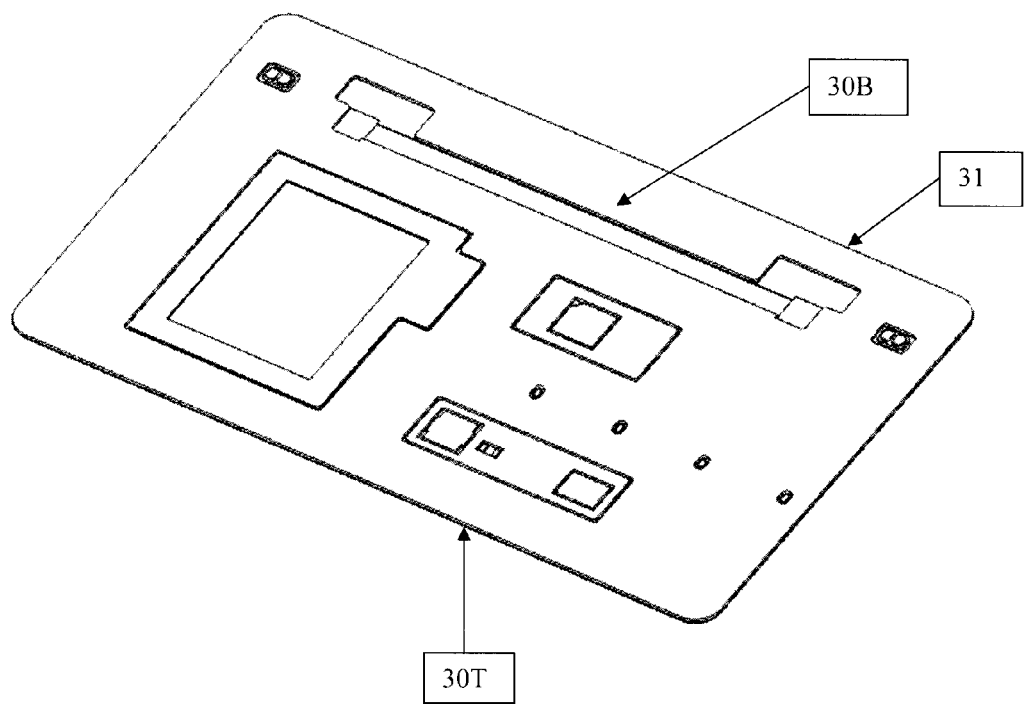
Figure 5:
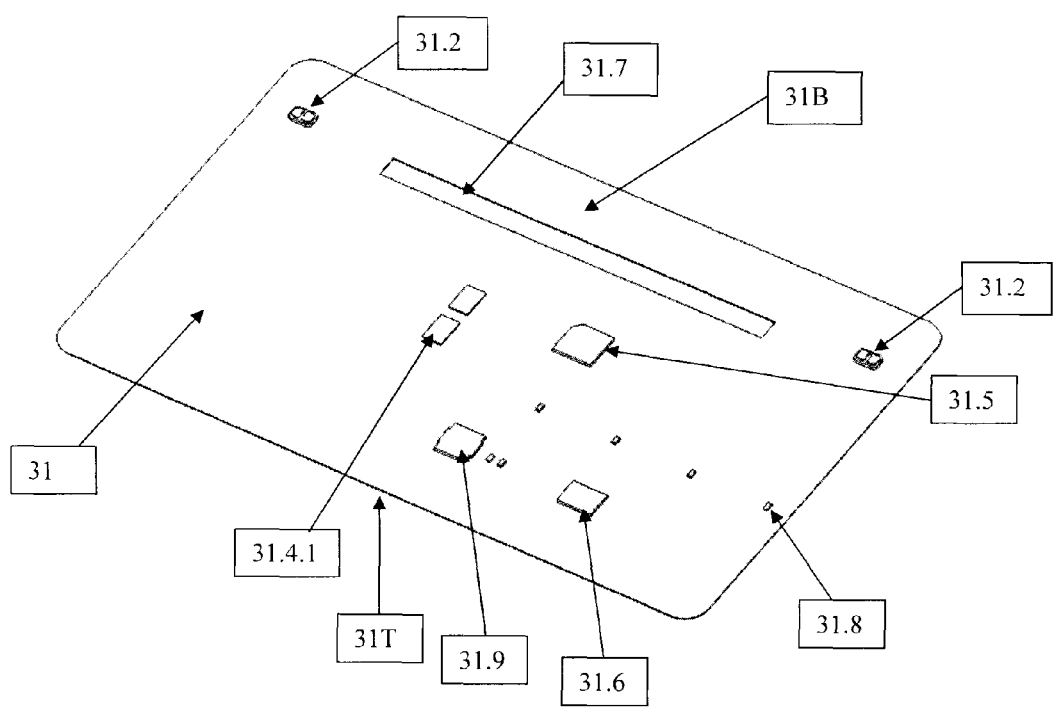
FIGS. 5-10 illustrate the components that are assembled together to form the inlay assembly illustrated in FIG. 4.

1 card
    1T top surface
    1B bottom surface
10 top graphic layer
    10T top surface
    10B bottom surface
    11 contact chip plate opening
20 top thermal sensitive adhesion tape
    20T top surface
    20B bottom surface
    21 contact chip plate opening
30 inlay assembly
    30T top surface
    30B bottom surface
    31 printed circuit board ("PCB") electronic assembly
        31T top surface
        31B bottom surface
        31PCB PCB on which the electronic assembly is formed
        31.2 trip switch
        31.5 electronic components (surface mounted)
        31.6 chip
        31.7 encoder
        31.8 LED
        31.9 on/off switch
    32 thermal sensitive adhesion tape
        32T top surface
        32B bottom surface
        32.2 trip switch opening
        32.6 chip opening
        32.7 encoder opening
        32.9 on/off switch opening
    33 glass fiber reinforce epoxy substrate
        33T top surface
        33B bottom surface
        33.2 trip switch opening
        33.5 surface mounted components opening
        33.6 chip opening
        33.7 encoder opening
        33.8 LED opening
    34 battery
    34.1 z-axis battery tape
    35 battery insert
    36 chip insert
    37 passive (non-LED) component insert
40 bottom thermal sensitive adhesion tape
    40T top surface
    40B bottom surface
    42 trip switch opening
50 bottom graphic layer
    50T top surface
    50B bottom surface
    52 trip switch opening
    58 account selection indicator
    59 on/off switch indicator A card in accordance with the present invention, shown generally as 1, includes three separate assemblies—PCB electronic assembly 31 (see FIG. 5) which is incorporated into inlay assembly 30 (see FIG. 4) which is then incorporated into a final assembly.

PCB electronic assembly 31 is assembled, preferably, by using electronic components that are surface mounted to a printed circuit board 31PCB in accordance with techniques that are well known in the industry. It is especially preferred that all electronic components mounted to PCB 31PCB be pre-assembled into leadless array packages of less than 0.4 mm thickness before mounting onto PCB 31PCB via standard surface mounted technology processes. In an especially preferred embodiment, a contact chip plate is mounted to top surface 31T while all of the other components are mounted to bottom surface 31B. The components mounted to bottom surface 31B include two trip switches 31.2, electronic components 31.5, one or two chips 31.6 (depending upon whether a combination of secure and non-secure chips are used or a single chip combining both functions is used), an encoder 31.7 (which can be mounted either by using surface mount technology or laminated to printed circuit board 31PCB), light emitting diodes (LEDs) 31.8 and on/off switch 31.9. Details regarding trip switches, use of secure and non-secure chips (microprocessors), and encoders are set forth in U.S. patent application Ser. Nos. 11/391,719 and 12/822,031, the disclosures of which are incorporated herein by reference. While the present invention will be described by reference to certain specific electronic components, it is not limited to a combination of any specific individual components. In this regard, many electronic components can be combined into an application-specific integrated circuit ("ASIC") when card volume reaches a point justifying such a design. Accordingly, design choice in terms of functions and card use, as well as advances in such technology, will dictate what specific electronic components, and how many such components, are mounted onto PCB 31PCB.

After the design of PCB electronic assembly 31 is determined, it must now be combined with other parts to obtain a fully functioning card that is ISO 7810 compliant. This is an area that has been a tremendous challenge for the industry. In order to be ISO 7810 compliant a card must meet size limitations while still being flexible, and this is not easy to accomplish when one must include a battery and many other electronic components in the card.

The present invention solves this problem by a unique design that incorporates PCB electronic assembly 31 into two other assemblies and uses lamination processes that operate at a much lower temperature than normal lamination processes requiring high heat to melt plastic components. Thus, instead of using high heat lamination processes to bond components together, as is common for the traditional manufacture of credit and debit cards which can use temperatures in excess of 100° C., the present invention uses a "warm" lamination process that causes the thermal sensitive adhesion tape to thermoset and thus form a laminate structure due to adhesion, but not so high of a temperature that it will damage the battery or melt any of the components being laminated together. Thus, for example, prototype cards have been made using the process set forth herein in which the lamination temperatures were significantly lower than the maximum battery operating temperature of 90° C. In addition, the present invention uses a stiffening substrate that is used to form a first assembly incorporating the PCB electronic assembly, and then one or more inserts are added around key electronic components, such as the battery and electronics.

Figure 6:
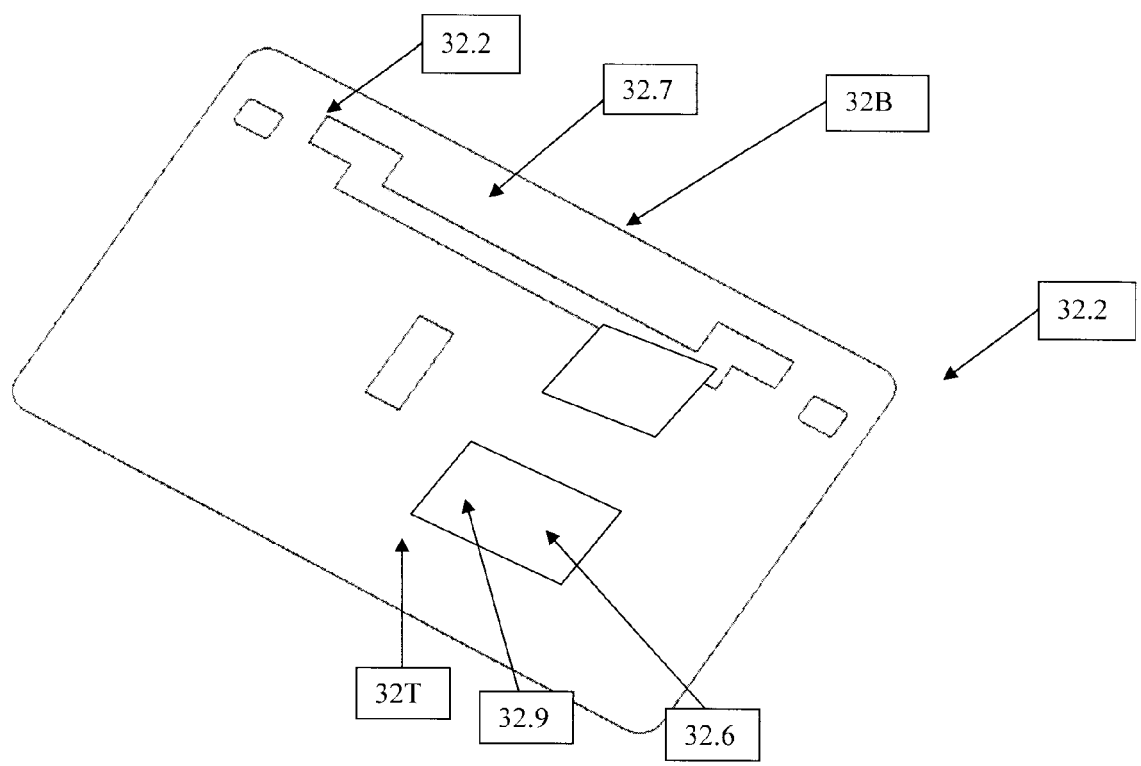
Figure 7:
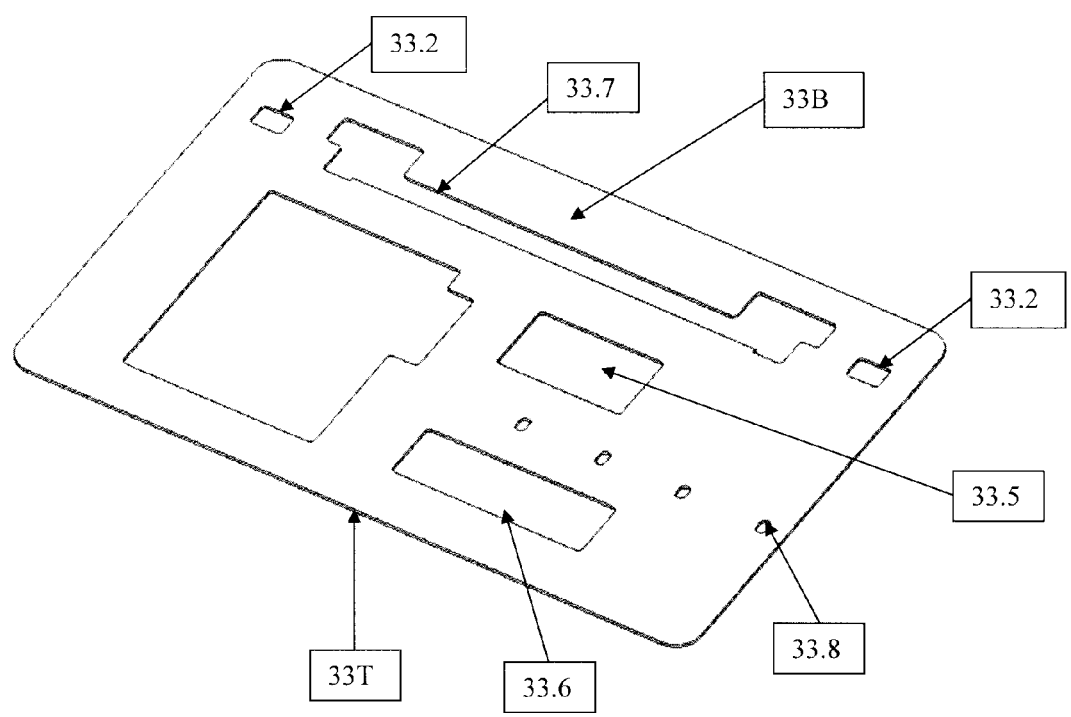
Figure 8:
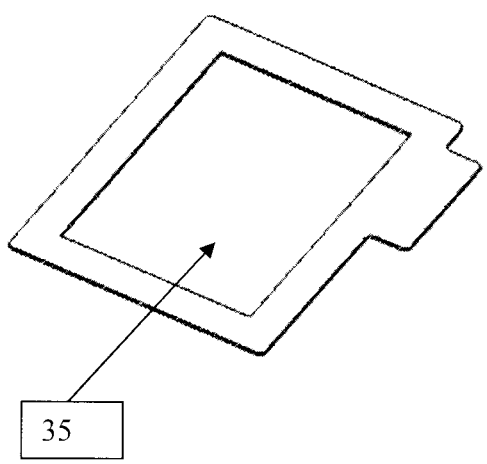
Figure 9:
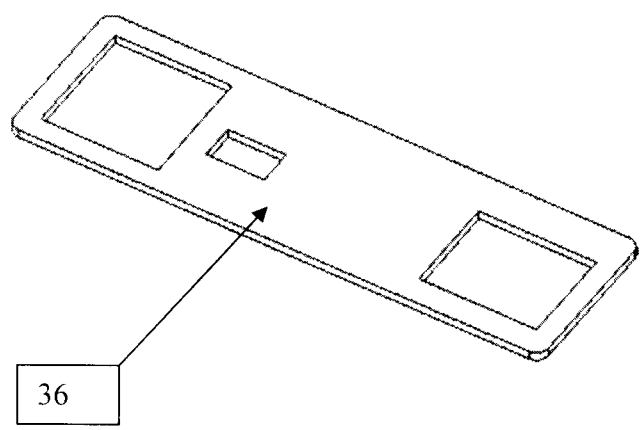
Figure 10:
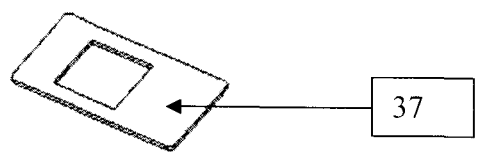
Figure 11:
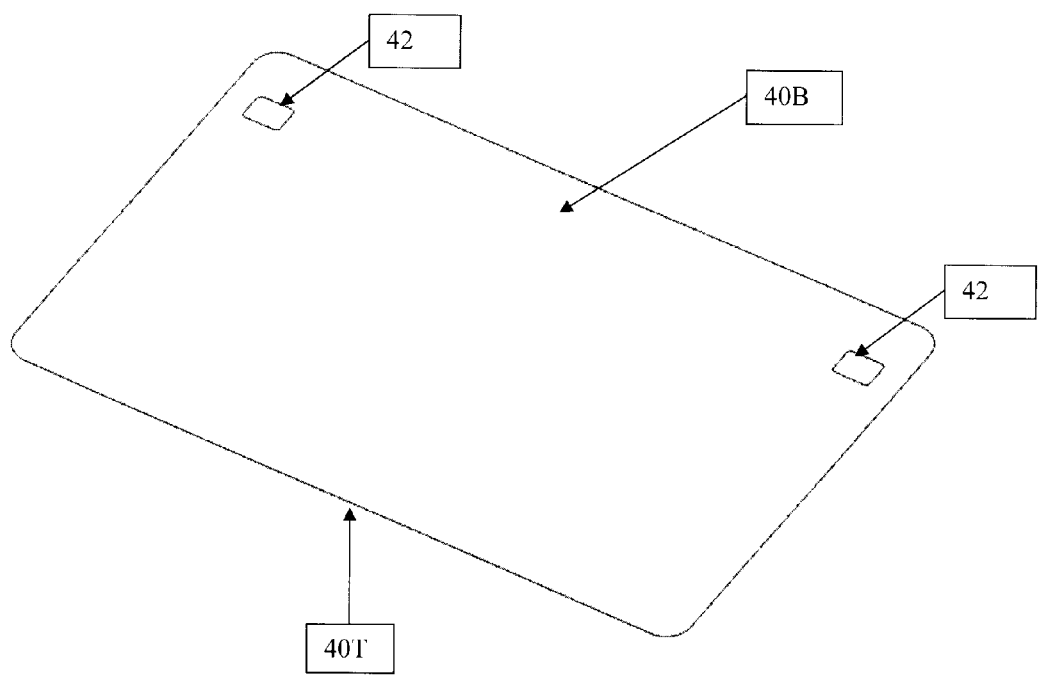
Figure 12:
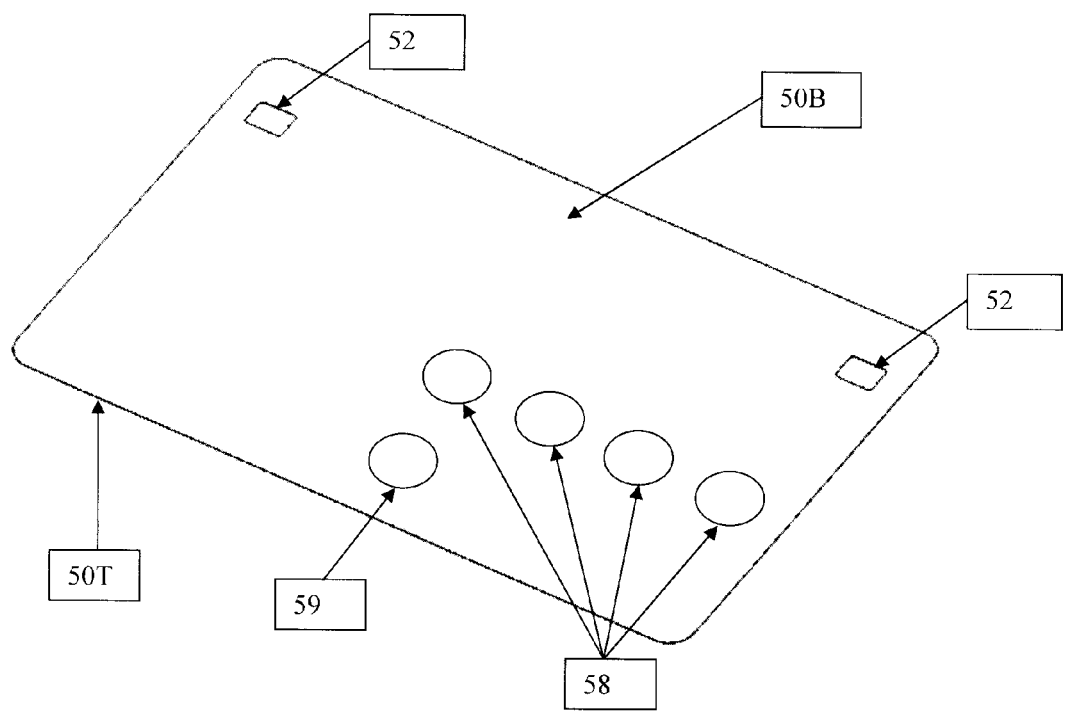
Figure 13:
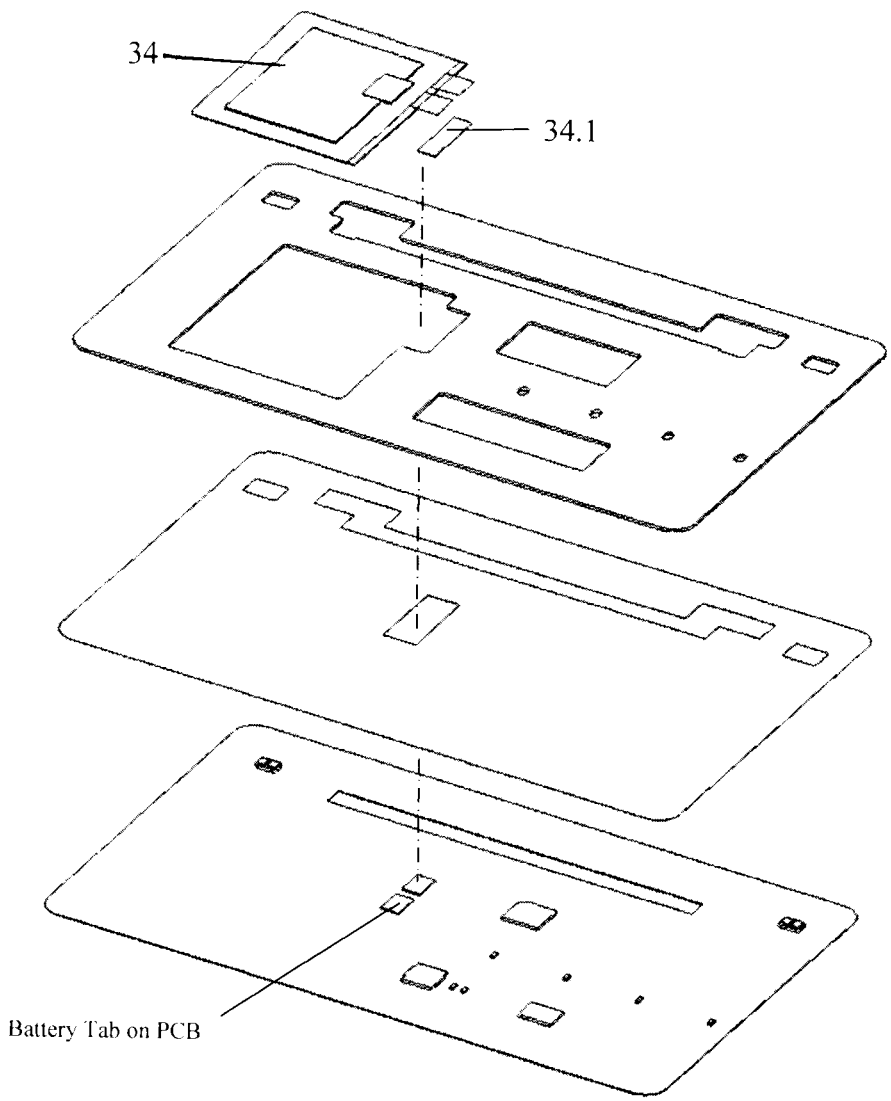
FIG. 13 illustrates application of z-tape to the batter during assembly.

The process of assembling inlay assembly 30 proceeds as follows. Thermal sensitive adhesion tape 32 (see FIG. 6) is applied on top of bottom surface 31B and then glass fiber reinforced epoxy substrate 33 (see FIG. 7) is applied on top of bottom surface 32B of thermal sensitive adhesion tape 32 and then these three components are laminated together in a firs lamination step. After this first lamination step, z-axis battery tape 34.1 is applied on top of bottom surface 32B and then battery 34 is applied (see FIG. 13). Although z-axis battery tape is more expensive than soldering for large volumes of cards, it avoids the use of solder, which allows card 1 to be made without the necessity of using any solder connections, which has environmental implications. Next, battery insert 35, chip insert 36 and passive component insert 37 are applied and the components are laminated to get inlay assembly 30.

Glass fiber reinforced epoxy substrate 33 provides a stiffening substrate that is necessary if card 1 is to satisfy existing standards regarding use of credit and debit cards. Glass fiber reinforced epoxy substrate 33 has a thermal expansion coefficient that is the same or substantially the same as printed circuit board 31PCB, and this helps to prevent warpage during the first lamination step.

Battery insert 35, chip insert 36 and passive component insert 37 are made of a PVC material that has a thermal expansion coefficient that is the same, or substantially the same, as that of the materials used to make top and bottom graphic layers 10 and 50. While each of battery insert 35, chip insert 36 and passive component insert 37 are illustrated as being continuous, they need be so. The key factor is that they should be sufficiently large to reduce thermal expansion to an acceptable level.

The stiffening substrate has a thermal coefficient that is substantially the same as that of the PCB base and provides a needed rigidity while the inserts, which have a greater bending flexibility than the stiffening substrate, prevent the final card from being too brittle.

Final assembly of card 1 involves laminating five separate pieces together. The pieces, proceeding from top surface 1T to bottom surface 1B, are top graphic layer 10, top thermal sensitive adhesion tape 20, inlay assembly 30, bottom thermal sensitive adhesion tape 40 and bottom graphic layer 50. Top and bottom graphic layers 10 and 50 are, preferably, made of polycarbonate and include graphic and other features, if desired, such a signature strip, magnetic stripe, security hologram, and printing, and bottom surface 50B contains account selection indicators 58 and on/off switch indicator 59.

The thermal sensitive adhesion tapes used in card 1 serve to hold the various components together and avoid the use of solder or a wet assembly process. A suitable thermal sensitive adhesion tape will thermoset at a temperature that is less than the maximum operating temperature of the battery. Thermal sensitive adhesion tapes 20, 40 and 32, along with glass fiber reinforce epoxy substrate 33, have suitable openings cut out from them to accommodate various electronic components, and such openings are preferably sized so as to provide a snug and tight fit without excess gaps, while still allowing for suitable openings to facilitate the assembly process steps.

In an especially preferred embodiment of the present invention, the various electronic components mounted to PCB 31PCB will have a thickness no greater than 0.4 mm, top and bottom graphic layers 10 and 50 will have a thickness of 0.085 mm, all of the thermal sensitive adhesion tapes will have a thickness of 0.02 mm, the stiffening substrate 33 will have a thickness of 0.4 mm, PCB 31PCB will have a thickness of 0.1636 mm, batter insert 35 will have a thickness of 0.3 mm and chip insert 36 and passive component insert 37 will have a thickness of 0.4 mm.

While the invention has been described herein with reference to a preferred embodiment, this embodiment has been presented by way of example only, and not to limit the scope of the invention. Additional embodiments thereof will be obvious to those skilled in the art having the benefit of this detailed description. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions.

What is claimed is:

1. An electronic card assembly, comprising:
   a top and a bottom graphic layer, a top and a bottom thermal sensitive adhesion tape and an inlay assembly laminated together, said inlay assembly having an inlay assembly top surface and an inlay assembly bottom surface, the top thermal sensitive adhesion tape being located between the top graphic layer and the inlay assembly top surface, the bottom thermal sensitive adhesion tape being located between the bottom graphic layer and the inlay assembly bottom surface;
   wherein the inlay assembly is comprised of:
   an inlay sub-assembly comprising a printed circuit board ("PCB") assembly having a PCB base and one or more electronic components mounted to the PCB base, an inlay sub-assembly thermal sensitive adhesion tape and a stiffening substrate laminated together, said inlay sub-assembly thermal sensitive adhesion tape being located between the PCB base and the stiffening substrate;
   a battery mounted to the inlay sub-assembly in a battery opening of the stiffening substrate on top of the inlay sub-assembly thermal sensitive adhesion tape and in electrical connection with the PCB base; and
   a battery insert mounted in the battery cavity on top of the inlay sub-assembly thermal sensitive adhesion tape between the battery and the stiffening substrate;
   wherein the stiffening substrate has a thermal coefficient that is substantially the same as that of the PCB base; and
   wherein the battery insert has a greater bending flexibility than the stiffening substrate.

2. The electronic card assembly of claim 1 wherein the battery insert is comprised of a flexible plastic.

3. The electronic card assembly of claim 2, further comprising:
   an electronic component insert made of a second flexible plastic mounted in an electronic component cavity in the stiffening substrate on top of the inlay sub-assembly thermal sensitive adhesion tape between a first of the one or more electronic components and the stiffening substrate.

4. The electronic card assembly of claim 3 wherein the flexible plastic and the second flexible plastic are comprised of a polyvinyl chloride ("PVC") material.

5. The electronic card assembly of claim 1, further comprising a second electronic component insert mounted in a second electronic component cavity in the stiffening substrate on top of the inlay sub-assembly thermal sensitive adhesion tape between a second of the one or more electronic components and the stiffening substrate.

6. The electronic card assembly of claim 1 wherein the plurality of electronic components are surface-mounted to the PCB base.

7. The electronic card assembly of claim 1 wherein an electrical connection between a pair of terminals of the battery and the PCB base is made by a z-axis conductive tape.

8. The electronic card assembly of claim 1 wherein the electronic card assembly does not contain any solder connections.

9. The electronic card assembly of claim 1 wherein the stiffening substrate, the battery and one of the one or more electronic components have a thickness that is approximately the same.

10. An electronic card assembly, comprising:
    a top and a bottom graphic layer, a top and a bottom thermal sensitive adhesion tape and an inlay assembly laminated together, said inlay assembly having an inlay assembly top surface and an inlay assembly bottom surface, the top thermal sensitive adhesion tape being located between the top graphic layer and the inlay assembly top surface, the bottom thermal sensitive adhesion tape being located between the bottom graphic layer and the inlay assembly bottom surface;

wherein the inlay assembly is comprised of:

an inlay sub-assembly comprising a printed circuit board ("PCB") assembly having a PCB base and one or more electronic components surface mounted to the PCB base, an inlay sub-assembly thermal sensitive adhesion tape and a stiffening substrate laminated together, said inlay sub-assembly thermal sensitive adhesion tape being located between the PCB base and the stiffening substrate;

a battery mounted to the inlay sub-assembly in a battery opening of the stiffening substrate on top of the inlay sub-assembly thermal sensitive adhesion tape and in electrical connection with the PCB base;

a battery insert mounted in the battery cavity on top of the inlay sub-assembly thermal sensitive adhesion tape between the battery and the stiffening substrate; and an electronic component insert mounted in an electronic component cavity in the stiffening substrate on top of the inlay sub-assembly thermal sensitive adhesion tape between a first of the one or more electronic components and the stiffening substrate;

wherein the stiffening substrate has a thermal coefficient that is substantially the same as that of the PCB base;

wherein the battery insert and electronic component insert are comprised of a polyvinyl chloride ("PVC") material; and wherein the card is ISO 7810 compliant.

11. The electronic card assembly of claim 10 wherein the electronic card assembly does not contain any solder connections.

12. A process for manufacturing an electronic card assembly, comprising:

laminating an inlay sub-assembly thermal sensitive adhesion tape and a stiffening substrate together with a printed circuit board ("PCB") assembly comprised of one or more electronic components mounted to a PCB base in a first lamination step to form an inlay sub-assembly in which the inlay sub-assembly thermal sensitive adhesion tape is located between the PCB base and the stiffening substrate;

mounting a battery on top of the inlay sub-assembly thermal sensitive adhesion tape in a battery opening of the stiffening substrate;

inserting a battery insert in the battery opening between the stiffening substrate and the battery to form an inlay assembly; and laminating a top and a bottom graphic layer and a top and a bottom thermal sensitive adhesion tape to the inlay assembly in a second lamination step to form the card assembly, said inlay assembly having an inlay assembly top surface and an inlay assembly bottom surface, the top thermal sensitive adhesion tape being located between the top graphic layer and the inlay assembly top surface, the bottom thermal sensitive adhesion tape being located between the bottom graphic layer and the inlay assembly bottom surface;

wherein the stiffening has a thermal coefficient that is substantially the same as that of the PCB base.

13. The process of claim 12 wherein the second lamination step relies upon adhesion of the top and the bottom thermal sensitive adhesion tapes to form a laminated structure.

14. The process of claim 12 wherein the second lamination step is performed at a temperature that is below a maximum operating temperature of the battery.

15. The process of claim 14 wherein the temperature is less than 90° C.

16. The process of claim 12 further comprising:

inserting an electronic component insert into an electronic component opening of the stiffening substrate on top of the inlay sub-assembly thermal sensitive adhesion tape between the stiffening substrate and at least one of the one or more electronic components before the second lamination step.

17. The process of claim 16 wherein the battery insert and the electronic component insert are comprised of a flexible plastic.

18. The process of claim 12 wherein the plurality of electronic components are surface-mounted to the PCB base.

19. The process of claim 12 further comprising forming an electrical connection between a pair of terminals of the battery and the PCB base by applying a z-axis conductive tape to the pair of terminals before the second lamination step.

20. The process of claim 12 wherein the electronic card assembly is assembled without the use of any solder connections.

* * * * *